United States Patent [19]

Di Bernardo

[11] Patent Number: 4,860,622
[45] Date of Patent: Aug. 29, 1989

[54] MACHINE FOR CUTTING SHEET MATERIAL BY MEANS OF A DINKING DIE

[75] Inventor: Pietro Di Bernardo, Milano, Italy

[73] Assignee: Interdibipack S.p.A., Milano, Italy

[21] Appl. No.: 95,646

[22] Filed: Sep. 14, 1987

[30] Foreign Application Priority Data

Oct. 7, 1986 [IT] Italy .................... 2330 86[U]

[51] Int. Cl.⁴ .................................................. B26F 1/42
[52] U.S. Cl. ........................................ 83/285; 83/284; 83/290; 83/319; 83/509; 83/567; 83/578
[58] Field of Search ............... 83/284, 285, 286, 290, 83/291, 292, 434, 435, 435.1, 509, 510, 372, 578, 318, 319, 567

[56] References Cited

U.S. PATENT DOCUMENTS

| | | | |
|---|---|---|---|
| 3,024,688 | 3/1962 | Romm | 83/510 X |
| 3,159,067 | 12/1964 | Heuman | 83/578 X |
| 3,631,753 | 1/1972 | Hall et al. | 83/399 |
| 3,800,641 | 4/1974 | Spengler | 83/50 |
| 3,867,859 | 2/1975 | Hirons | 83/284 |
| 4,463,062 | 2/1987 | Highfield et al. | 83/285 |

Primary Examiner—Frank T. Yost
Assistant Examiner—Eugenia A. Jones
Attorney, Agent, or Firm—Finnegan, Henderson, Farabow, Garrett & Dunner

[57] ABSTRACT

A machine for cutting sheet material by means of a dinking die comprises a pair of pressure rollers through which a pack represented by a sheet material/dinking die is caused to pass by travel along a work surface transversely to a pair of rollers supported by a central frame; provision also being made for a drive unit with relative controls for rotating at least one of the rollers of the said pair alternatively in one of the two directions, wherein the said sheet material/dinking die pack are held in place by a rectangular containment frame.

2 Claims, 3 Drawing Sheets

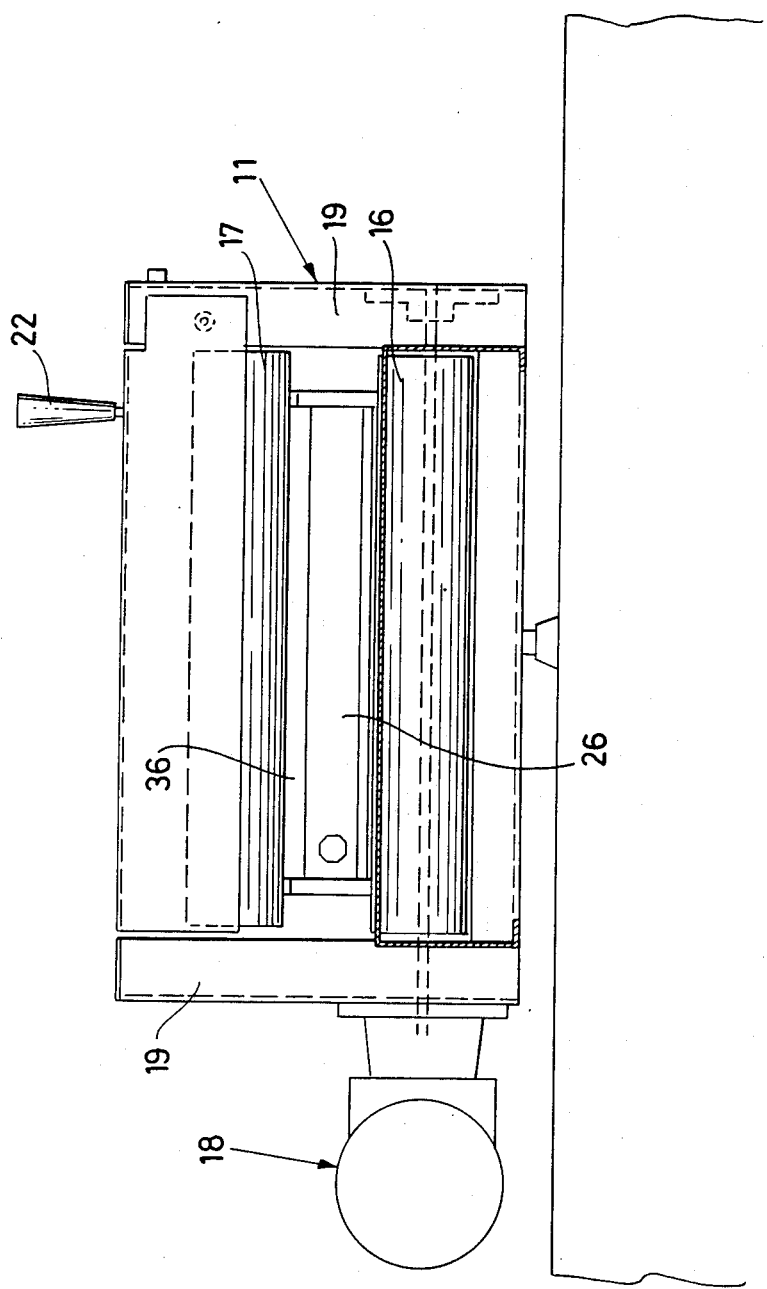

MACHINE FOR CUTTING SHEET MATERIAL BY MEANS OF A DINKING DIE

The present invention relates to an improved machine for cutting sheet material, which can be of a wide variety of types, by means of a dinking die.

For the cutting of sheet material using a dinking die it is known to use hydraulic presses of considerably elevated power. One or more sheets and the relative dinking die are superimposed and positioned on the fixed table of the press; the movable table is then lowered towards the fixed table so as to bring a high pressure to bear on the pack represented by the sheet material and dinking die so that the blades of the dinking die cut the material.

Though presses of the type described operate satisfactorily, they have a very high cost which is justified only for certain types and quantities of production.

Machines are also known in which a pack represented by the sheet material and dinking die is passed through a pair of superimposed pressure rollers, which are generally both powered.

More exactly, the pair of superimposed rollers is supported centrally and transversely on a work surface along which the pack represented by the sheet material and dinking die is fed to and fro by reversal of the rotation direction of the said rollers.

These machines, too, however—given their relatively limited use—are considerably costly, particularly as a result of the double powering of the rollers, the relative drive linkages and electric controls, all of which appreciably affect the final costs.

In addition, the known types of machines featuring rollers present functional difficulties, primarily the difficulty of assuring that the sheet material/dinking die pack is fed correctly along the work surface without more than negligible stresses transmitted by the pair of rollers modifying the initial mutual sheet material/dinking die position, nor either their position with respect to the longitudinal axis of the machine—to the detriment of cutting precision and often with unwanted jibbing giving rise to interruption of the work cycle.

Another problem with such machines is that the operator has always to keep the motor control switch positively excited until such time as the sheet material/dinking die pack has passed in its entirety through the pressure rollers; when the switch is released the motor is stopped and the cycle is therefore brought to an end—unless the machine is equipped with a plurality of controls and costly limit switches.

The overall object of the present invention is to obviate the above mentioned difficulties, in particular by embodying a machine which is extremely straightforward and economical to construct provided with means able to assure that the sheet material/dinking die pack passes correctly positioned between the pressure rollers so as to permit high precision cutting of the sheet material.

Another object of the invention is to embody a machine provided with a very low-cost limit switch system which is nonetheless able to assure a semi-automatic operation of the said apparatus, i.e. with automated arrest of the sheet material/dinking die pack after each passage through the pair of pressure rollers and with the system pre-disposed for manual control by the operator as regards the passage of a fresh sheet material/dinking die pack in a direction opposite to that of a previous pack.

Another object of the invention is to embody a machine having a modular-element structure able to be packaged in a minimum space and thus with self-evident savings in respect both of packaging and dispatch costs.

A further object of the invention is to embody a machine provided with a safety system adapted to arrest the rotation of the rollers automatically if the operator inadvertently traps his hand between the roller and sheet-material/dinking die pack.

To attain the aforesaid objects, the invention embodies a machine for cutting sheet material by means of a dinking die of the type comprising a pair of pressure rollers through which the sheet material/dinking die pack is passed by means of travel on a work surface transversely to which the said pair of rollers is supported through the intermediary of a central frame, provision also being made for at least a drive unit with relative controls for rotating at least one roller of the said pair alternately in one or the other direction, wherein there are associated with the said sheet material/dinking die pack longitudinal and transversal containment means.

The containment means preferably consist of rectangular frame surrounding the sheet material/dinking die pack.

The said frame is preferably also provided with locking means able to restrain the dinking die to it in a stable manner and in a pre-set operational position.

In addition, at the opposite ends of the said frame there are preferably provided respective mechanical limit switches which cooperate alternately with respective electric limit switches provided on the said central frame and acting so as to arrest the rotation of the powered roller at the end of each operating cycle.

Typically, the said mechanical limit switches act on the respective electric limit switches with the interposition of a casing mounted on the said frame in a manner swinging between three positions: a first central position in which the rotation of the rollers is arrested and two lateral positions in which the rollers rotate respectively in one or the other direction.

The structural and functional characteristic of the invention, and its advantages over the known art, will become more apparent from an examination of the following description, referred to the attached diagrammatic drawings which show an example of a machine embodied according to the innovative principles of the invention:

In the drawings:

FIG. 3 is a sectional view taken along the line III-—III in FIG. 1; and

FIGS. 4 and 5 are partial views showing the operation of the electrical switches.

Figure 1:
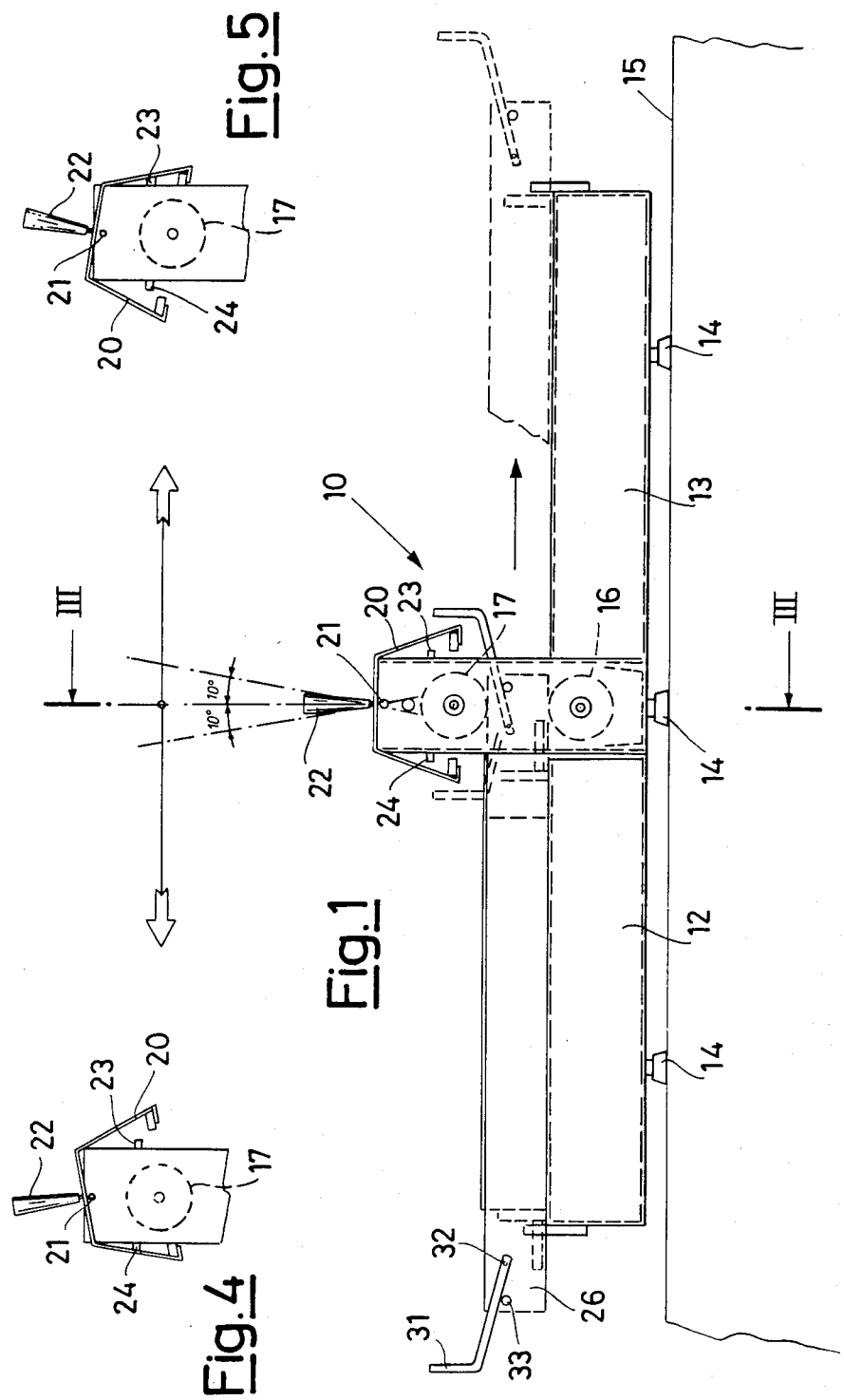
FIG. 1 is a longitudinal sectional view illustrating the said machine.
Figure 2:
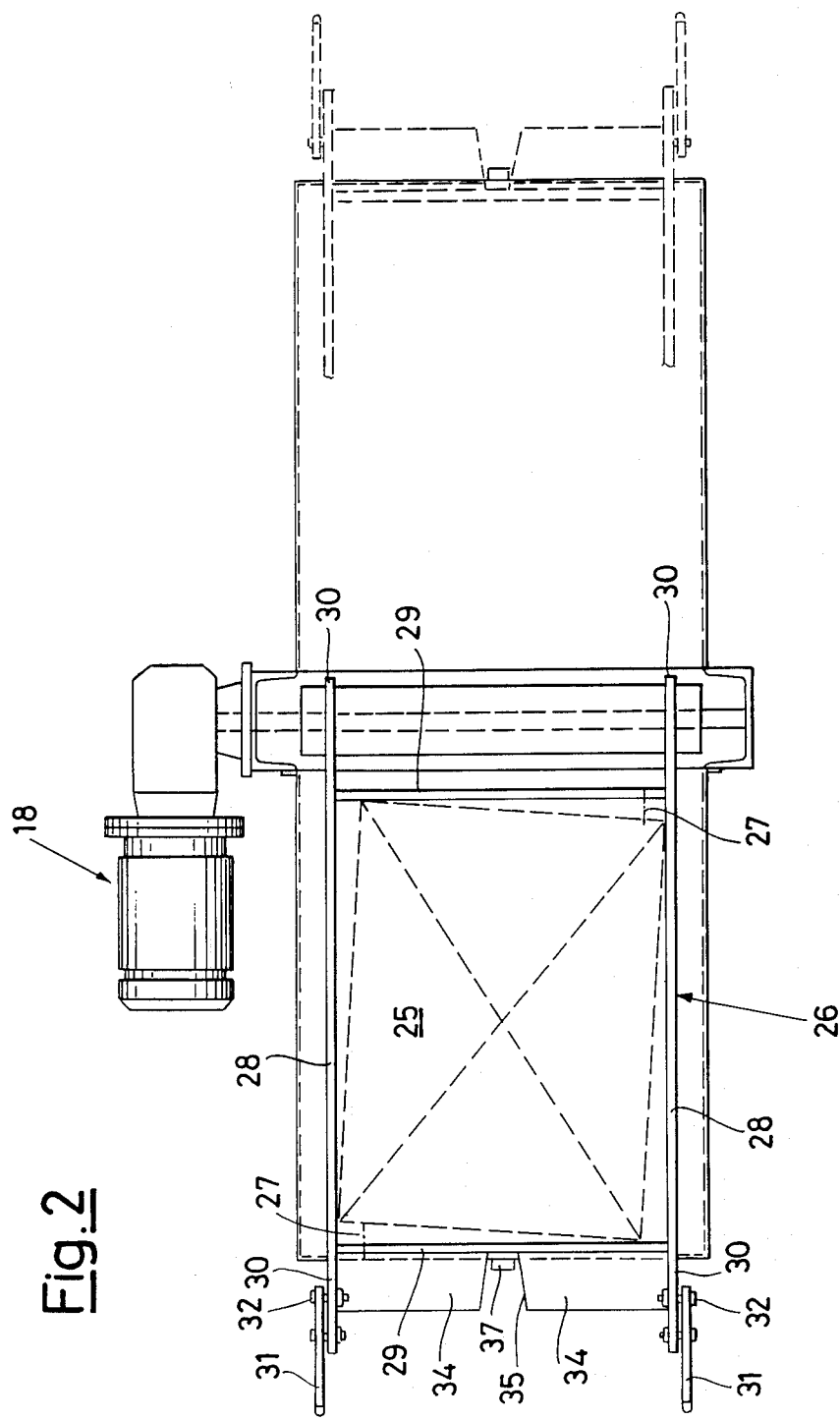
FIG. 2 is a plan view of the machine in FIG. 1.

With reference to the drawings, the machine in question is indicated overall by 10 and consists structurally of a central transverse frame 11 to which are bolted two-shaped work surfaces 12,13 which extend in opposite directions from the frame 11 as it is clearly shown in the drawings. The numeral 14 indicates feet for supporting the machine on a support surface 15, for example a carriage.

The frame 11 carries a pair of superimposed lower and upper pressure rollers 16, 17, respectively. The lower roller 16 is powered by a geared motor 18 fixed laterally to one of the uprights 19 of the frame 11, while the upper roller 17 is freely rotating.

Between the uprights 19 of the frame 11 there extends on the upper side a casing 20 which has an essentially "U"-shaped cross section and which is pivoted around an axis 21 in a manner swingable between the central position of FIG. 1 and the lateral positions of FIGS. 4 an 5. The swinging of the casing 20 around the axis 21 is controlled manually by means of a ball-grip 22. Opposed flanges of the casing 20 cooperate with two microswitches 23, 24 mounted on opposite sides of one of the uprights 19 that control the rotation of the motor 18 and thus of the roller 16, alternately in one or the other direction.

The numeral 25 indicates overall a dinking die of a type known as it is and therefore not described in greater detail, on which a sheet or a plurality of sheets to be cut are positioned and covered by a pressure plate 36. Characteristically, according to the invention, the dinking die 25 is contained within a rectangular frame 26 and locked within it in a desired position through the intermediary of locking means indicated diagramatically by 27. The opposite longitudinal sides 28 of the frame 26 extend beyond the transversal sides 29 as extensions 30 which carry respective mechanical limit switches in the form of small angle rods 31 pivoted at 32 to the extension 30. Cooperating with the angle rods 31 are arrest pins 33 which keep the angle rods 31 in the operational position shown in FIG. 1 of the drawings.

As can be clearly seen from the drawings, the angle rods 31 are adapted to cooperate with the opposed flanges of the swingable casing 20 in the manner explained hereinafter.

In addition, from transversal sides 29 of the frame 26 there extend respective swallow-tail extensions 34 the central flared part 35 of which cooperates with a respective arrest tooth 37 projecting from the work surfaces 12, 13.

Briefly, the machine described above operates as follows. The dinking die 25 is disposed and blocked within the frame 26, resting on one of the the two work surfaces 12, 13, for example the left-hand one looking at FIG. 1.

The frame 26 containing the dinking die 25 is pushed manually through the pressure rollers 16, 17 and to this end the angle rods 31 at the end of the frame 26 are first lowered within the frame 26 by manual rotation about 32 so they can pass through the rollers 16, 17 and then raised to the operating position shown in FIG. 1. At this point the machine is pre- set for the start of the first operating cycle and at least one sheet to be cut is placed on the dinking die and covered with the pressure plate.

The operating cycle is started by moving the casing 20 to the position shown in the FIG. 5, by which there is energized the microswitch 23 which starts the motor 18 controlling the rotation of the powered roller 16. In consequence, the frame 26 containing the sheet material/dinking die pack is entrained to pass in its entirety through the pair of pressure rollers 16, 17 which effect the die cutting operating by coming to bear on the upper sheet of the pack projecting from the upper edge of the frame 26. The motor stops as soon as the posterior limit switch angle rod 31 meets the casing 20, causing it to swing into the central position shown in FIG. 1 in which both the microswitches 23, 24 are de-energized; the residual run through inertia of the frame 26 along the right-hand work surface 13 is halted by engagement of the tooth 37 within the hollow 35 of the swallow-tail 34. The operator can then remove the die cut product from the dinking die 25 and replace it by another sheet to be cut and then repeat the operation described above, this time from right to left looking at FIG. 1. It will not however be any longer necessary to lower the other limit switch angle rod 31 which remains already positioned beyond the pair of pressure rolls 16, 17 as a result of the presence of the extensions 30 at the ends of the longitudinal sides 28 of the frame 26.

The die-cutting operation from right to left will be started by moving the casing 20 to the position shown in FIG. 4.

From what has therefore been described with reference to the Figures, it will be apparent that a machine embodied according to the innovative principles of the invention is extremely straight forward as to construction and mounting, and thus also economical, owing to the fact that only one pressure roller can be powered inasmuch as the sheet material/dinking die pack is contained within the rectangular frame both during the passage through the superimposed pressure rollers and during the translation along the work surface.

In addition, the presence of the containment-frame for the sheet material/dinking die pack permits advance provision for a convenient and economical electromechanical limit switch system.

It is also apparent that the two work surfaces 12, 13 separated by the central frame 11 can be disposed, for packaging and dispatch purposes, one on top of the other at the side of the frame 11 itself, so as to occupy a minimum space.

It should lastly be noted that the dinking die 25 can be disposed within the frame 26 in an oblique position with respect to the longitudinal axis of symmetry of the machine, so that the pressure rollers 16, 17 will bring their pressure to bear on the blades of the dinking die at successive points and not simultaneously on the entire length of each blade, which fact diminishes wear.

I claim:

1. A machine for cutting sheet material against a dinking die comprising a main frame, a cooperating pair of spaced upper and lower pressure rollers mounted on the main frame parallel to each other, means for rotating at least one of the rollers of said pair alternatively in either direction, a control means for controlling rotation of said one roller, said control means comprising a pair of electrical switches, one switch being mounted to the main frame on one side of the pair of rollers and the other switch being mounted on the opposite side with one switch controlling rotation of said one roller in one direction and the other switch controlling rotation of said one roller in the other direction, a work surface extending outwardly from both sides of the main frame transverse to the axis of rotation of the pair of pressure rollers, and a rectangular containment frame for holding a dinking die, at least one piece of sheet material and a pressure plate in position for travel along the work surface and through the pressure rollers, said containment frame comprising two longitudinal sides and two transverse sides joined together to form a rectangular shape, said sides having a thickness greater than the thickness of the die and means for locking the die in position in the containment frame so that the containment frame surrounds the die and the piece of sheet material to be cut and a portion of the pressure plate while a portion of the pressure plate extends above the sides of the containment frame for contact with the upper pressure roller, said longitudinal sides of the containment frame extending beyond the transverse sides and having lever arms pivotally mounted to the ends of said longitudinal sides for movement between a first position where they do not obstruct passage of the frame through the rollers and an operating position where they deactuate one of the said electrical switches after the sheet material and die have passed through the pair of rollers to stop further rotation of said one roller.

2. The machine of claim 1, including a U-shaped casing swingably mounted to the main frame have said switches for engagement with said switches and for contact by said lever arms, said casing being swingable between a first central position where neither switch is actuated and said one roller is stopped and two alternative positions to either side of its central position where one or the other of the pair of electrical switches is actuated to rotate said one roller in one or the other direction, the lever arms upon contact with the casing returning it to its central position to stop further rotation of said one roller.

* * * * *

UNITED STATES PATENT AND TRADEMARK OFFICE
CERTIFICATE OF CORRECTION

PATENT NO. : 4,860,622

DATED : August 29, 1989

INVENTOR(S) : Pietro Di Bernardo

It is certified that error appears in the above-identified patent and that said Letters Patent is hereby corrected as shown below:

Claim 2, column 5, line 11, change "have" to --above--.

Signed and Sealed this

Twelfth Day of February, 1991

Attest:

HARRY F. MANBECK, JR.

*Attesting Officer*     Commissioner of Patents and Trademarks

UNITED STATES PATENT AND TRADEMARK OFFICE
CERTIFICATE OF CORRECTION

PATENT NO. : 4,860,622

DATED : August 29, 1989

INVENTOR(S) : Pietro Di Bernardo

It is certified that error appears in the above-identified patent and that said Letters Patent is hereby corrected as shown below:

Title Page, Foreign Application Priority Data, change "2330 86" to --23306/86--.

Signed and Sealed this

Fifteenth Day of October, 1991

*Attest:*

HARRY F. MANBECK, JR.

*Attesting Officer*  *Commissioner of Patents and Trademarks*